United States Patent
Beck et al.

(10) Patent No.: US 10,228,825 B1
(45) Date of Patent: Mar. 12, 2019

(54) DISPLAY AND ANALYSIS OF INFORMATION RELATED TO MONITORED ELEMENTS OF A COMPUTER SYSTEM

(71) Applicants: Laura G. Beck, Highland Park, NJ (US); Timothy L. Smith, Austin, TX (US)

(72) Inventors: Laura G. Beck, Highland Park, NJ (US); Timothy L. Smith, Austin, TX (US)

(73) Assignee: CA, Inc., New York, NY (US)

( * ) Notice: Subject to any disclaimer, the term of this patent is extended or adjusted under 35 U.S.C. 154(b) by 330 days.

(21) Appl. No.: 14/055,087

(22) Filed: Oct. 16, 2013

(51) Int. Cl.
*G06F 3/0484* (2013.01)

(52) U.S. Cl.
CPC .................. *G06F 3/0484* (2013.01)

(58) Field of Classification Search
CPC ........ G06F 11/00; G06F 11/008; G06F 11/30; G06F 3/048
See application file for complete search history.

(56) References Cited

U.S. PATENT DOCUMENTS

| 5,862,381 | A * | 1/1999 | Advani | G01R 13/029 345/684 |
| 8,024,660 | B1 * | 9/2011 | Quinn | G06F 9/4446 715/745 |
| 2002/0123816 | A1 * | 9/2002 | Tanaka | G05B 19/41875 700/108 |
| 2007/0201018 | A1 * | 8/2007 | Takeda | G01N 21/95607 356/237.2 |
| 2008/0255807 | A1 * | 10/2008 | Gross | G06F 11/30 702/186 |
| 2008/0301574 | A1 * | 12/2008 | Sanghvi | G06F 11/3466 715/771 |
| 2010/0309200 | A1 * | 12/2010 | Baumler | G06T 11/206 345/419 |

\* cited by examiner

*Primary Examiner* — Kevin L Young
*Assistant Examiner* — Seth A Silverman
(74) *Attorney, Agent, or Firm* — Baker Botts L.L.P.

(57) ABSTRACT

In accordance with the teachings of the present disclosure, a method of generating a graphical user interface is disclosed. The method includes monitoring a plurality of elements of a computer system and collecting data related to a monitored characteristic of each element of the plurality of elements. The method also includes analyzing the collected data at a first time to identify a pattern and analyzing the collected data at a second time to determine whether the collected data has deviated from the identified pattern. The method further includes generating an alert record in response to a determination that the collected data has deviated from the identified pattern and storing the alert record. Additionally, the method includes generating graphical display information related to the alert record.

16 Claims, 6 Drawing Sheets

DISPLAY AND ANALYSIS OF INFORMATION RELATED TO MONITORED ELEMENTS OF A COMPUTER SYSTEM

BACKGROUND

The present disclosure relates generally to information services infrastructure and network management, and more specifically, to a graphical user interface used to display information related to monitored elements of a computer system. Computer systems may include many elements communicatively coupled to one another via a network. Networking and sharing of elements adds a level of complexity that is not present with a single element, standing alone. Network and system administrators may manage network elements using various software tools, which may include a graphical user interface.

Application code runs on computer systems. One application may have code running on various elements of a computer system. The application itself may be managed by network or system administrators using various software tools which measure various monitored characteristics of the application itself, as well as the various elements of the computer system on which the application is running.

Traditional graphical user interfaces for software tools used by network and system administrators to monitor elements of a computer system may display data related to various monitored characteristics of the elements. The data related to the monitored characteristics may be displayed in the form of metrics, each of which may represent a measure of a particular monitored characteristic.

BRIEF SUMMARY

According to one aspect of the present disclosure, a method of generating a graphical user interface is disclosed. The method includes monitoring a plurality of elements of a computer system and collecting data related to a monitored characteristic of each element of the plurality of elements. The method also includes analyzing the collected data at a first time to identify a pattern and analyzing the collected data at a second time to determine whether the collected data has deviated from the identified pattern. The method further includes generating an alert record in response to a determination that the collected data has deviated from the identified pattern and storing the alert record. Additionally, the method includes generating graphical display information related to the alert record.

According to another aspect of the present disclosure, a computer-readable storage medium, comprising computer-executable instructions carried on the computer readable medium is disclosed. The instructions are readable by a processor and, when read and executed, are configured to cause the processor to monitor a plurality of elements of a computer system and collect data related to a monitored characteristic of each element of the plurality of elements. The instructions are further configured to, when read and executed, cause the processor to analyze the collected data at a first time to identify a pattern and analyze the collected data at a second time to determine whether the collected data has deviated from the identified pattern. The instructions are also configured to, when read and executed, cause the processor to generate an alert record in response to a determination that the collected data has deviated from the identified pattern, store the alert record, and generate graphical display information related to the alert record.

According to yet another aspect of the present disclosure, an apparatus for monitoring a plurality of elements of a computer system is disclosed. The apparatus includes a processor and a memory communicatively coupled to the processor. The memory includes instructions operable, when executed by the processor, to cause the processor to monitor a plurality of elements of a computer system and collect data related to a monitored characteristic of each element of the plurality of elements. The instructions are further operable to, when executed, cause the processor to analyze the collected data at a first time to identify a pattern and analyze the collected data at a second time to determine whether the collected data has deviated from the identified pattern. The instructions are also operable to, when executed, cause the processor to generate an alert record in response to a determination that the collected data has deviated from the identified pattern, store the alert record, and generate graphical display information related to the alert record.

BRIEF DESCRIPTION OF THE DRAWINGS

For a more complete understanding of the configurations of the present disclosure, needs satisfied thereby, and the objects, features, and advantages thereof, reference now is made to the following description taken in connection with the accompanying drawings.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "element," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), a digital versatile disk (DVD), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In accordance with the teachings of the present disclosure, a graphical user interface may be provided in which a user may view and/or access alert records related to an unusual trend and/or pattern in data associated with one or more monitored characteristics of one or more elements. In some embodiments, an alert corresponding to a particular alert record may be displayed to a user. In other embodiments, an alert record may not be displayed to a user. Each alert record may identify the monitored elements included in the unusual trend and/or pattern related to the particular alert record. Each alert record may further identify, for each monitored element included in the unusual trend and/or pattern, the monitored characteristics included in the unusual trend and/or pattern. In some embodiments, the graphical user interface may be configured to display data associated with the monitored characteristics and elements included in the alert on a single graph. By overlapping the data for a group of monitored elements onto a single graph, trends in the data related to various monitored characteristics may be compared among elements. Particular embodiments and their advantages are best understood by reference to FIGS. 1 through 7, wherein like numbers are used to indicate like and corresponding parts.

Figure 1:
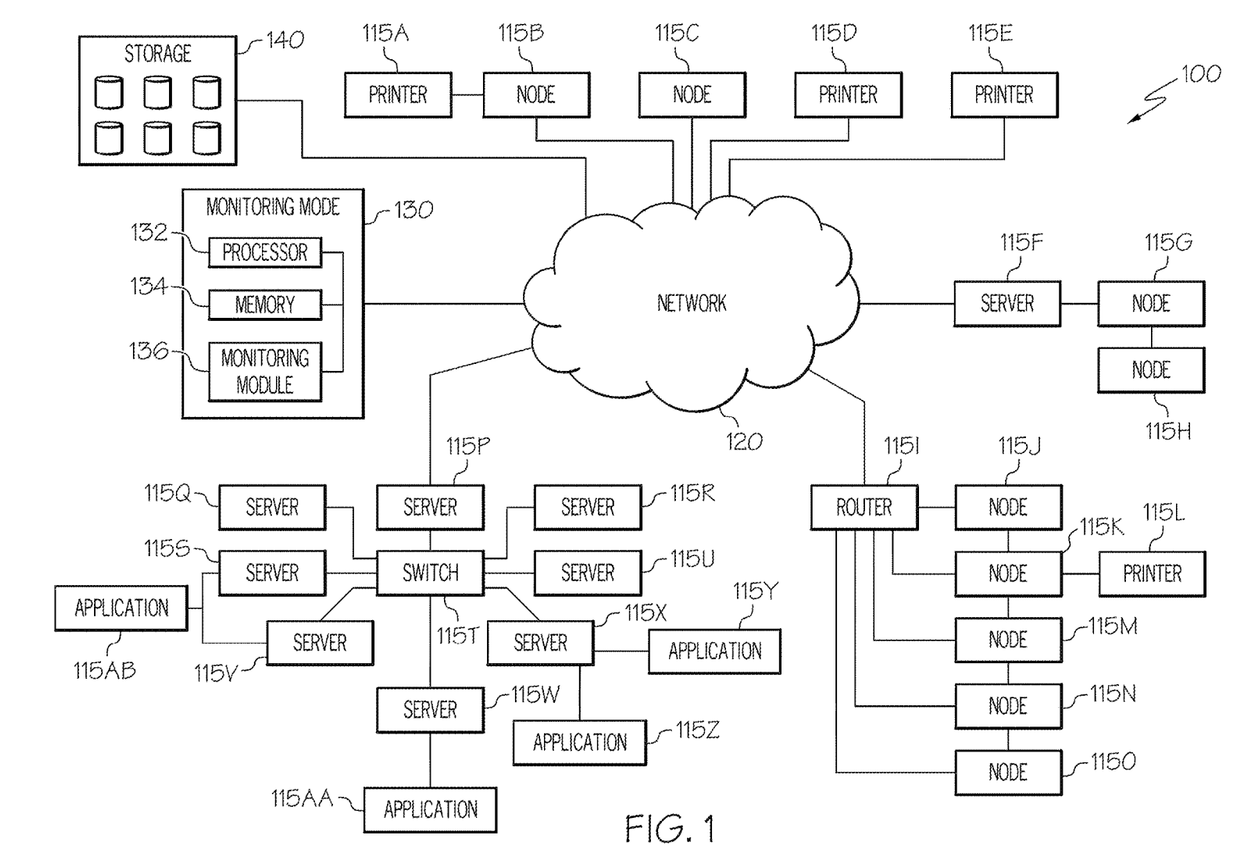
FIG. 1 is a block diagram of an example computer system including monitored elements and a monitoring node, in accordance with the teachings of the present disclosure.

FIG. 1 is a block diagram of an example system 100, which may include a plurality of elements 115, a monitoring node 130, and a network 120. Each element 115 may include a physical or logical element communicatively coupled to monitoring node 130 via network 120. For example, each element 115 may include a server (e.g., blade server or rack server), personal computer (e.g., desktop or laptop), tablet computer, mobile device (e.g., personal digital assistant (PDA) or smart phone), network storage device, printer, switch, router, data collection device, virtual machine, script, executable, firmware, library, shared library, function, module, software application, or any other suitable device or application. Although example system 100 is shown in FIG.

1 as including a particular number of elements 115, a system may include more than or fewer than the number of elements 115 illustrated. Similarly, although example system 100 is shown in FIG. 1 as including elements 115 of particular types, a system may include elements 115 of types other than those shown in FIG. 1.

Network 120 may include a network and/or fabric configured to communicatively couple elements 115, monitoring node 130, and/or any element associated with system 100. Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system configured to facilitate the communication of signals, data and/or messages (generally referred to as data). Network 120 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

Monitoring node 130 may include a processor 132, a memory 134, and a monitoring module 136. Processor 132 may be communicatively coupled to memory 134 and monitoring module 136. Processor 132 may include any system, device, or apparatus operable to interpret and/or execute program instructions and/or process data, and may include without limitation a microprocessor, a microcontroller, a digital signal processor (DSP), an application specific integrated circuit (ASIC), or any other digital or analog circuitry configured to interpret and/or execute program instructions and/or process data.

Memory 134 may be configured in part or whole as application memory, system memory, or both. Memory 134 may include any system, device, or apparatus configured to hold and/or house one or more memory modules. Each memory module may include any system, device or apparatus configured to retain program instructions and/or data for a period of time (e.g., computer-readable storage media).

Monitoring module 136 may include computer-program instructions resident in memory 134 (or another computer-readable medium communicatively coupled to monitoring node 130) and capable of being executed by processor 132. Monitoring module 136 may be configured to monitor various characteristics of elements 115. Such characteristics may include, but are not limited to, utilization, response time, performance, throughput, transaction count, and other characteristics related to usage and/or performance of elements 115. Monitoring module 136 may be configured to collect data related to various metrics. Each metric may represent a measure of a particular monitored characteristic. Where a single characteristic is referenced, it may be understood that multiple characteristics may be monitored and/or utilized. Data related to a particular metric may include values representing a measure of the particular monitored characteristic. In some embodiments, the data collected by monitoring module 136 may be stored in memory 134. In other embodiments, the data collected by monitoring module 136 may be stored in storage 140.

Storage 140 may include a database, directory, or other data structure operable to store data. Further, storage 140 may include any instrumentality or aggregation of instrumentalities that may retain data and/or instructions for a period of time. Storage 140 may include random access memory (RAM), electrically erasable programmable read-only memory (EEPROM), a Personal Computer Memory Card International Association (PCMCIA) card, flash memory, solid state disks, hard disk drives, magnetic tape libraries, optical disk drives, magneto-optical disk drives, compact disk drives, compact disk arrays, disk array controllers, and/or any suitable selection or array of volatile or non-volatile memory operable to store data.

Monitoring module 136 may be configured to actively and/or passively monitor elements 115. For example, monitoring module 136 may actively monitor a particular element 115 by querying element 115 for specific information and/or measuring the time it takes element 115 to respond to queries. Monitoring module 136 may passively monitor a particular element 115 by, for example, accessing and analyzing an error log, or other performance related log maintained by an element 115 or another component of system 100.

In accordance with the teachings of the present disclosure, monitoring node 130 may be configured to analyze data collected by monitoring module 136 and generate an alert record if an unusual trend and/or pattern is detected in data related to a monitored characteristic of an element 115. For example, monitoring node 130 may analyze historical data collected by monitoring module 136 to identify trends and/or patterns in the historical data. Identified trends and/or patterns in historical data may be used to define typical and/or normal behavior of elements 115. In some embodiments, monitoring node 130 may use multivariate statistical analysis to identify trends and/or patterns in historical data related to the various monitored characteristics of elements 115. As additional data is collected by monitoring module 136, monitoring node 130 may analyze more recently collected data to identify deviations from the trends and/or patterns identified in the historical data. Monitoring node may, for example, utilize multivariate statistical analyses to identify deviations from identified trends and/or patterns in historical data. Such deviations may be referred to as unusual trends and/or patterns.

An unusual trend and/or pattern may include a trend and/or pattern in data related to a monitored characteristic that differs or deviates from an identified trend and/or pattern. For example, an unusual trend and/or pattern may include peaks or flat points in the data related to a particular monitored characteristic that differ or deviate from an identified trend and/or pattern. Additionally, an unusual trend and/or pattern may include a trend and/or pattern in the data related to a group of monitored characteristics that is unusual only when analyzed in combination. For example, a high transaction count and low response time for a particular element 115 may not be unusual when viewed in isolation. When the data related to these metrics is analyzed together, however, it may be revealed that a high transaction count in combination with a low response time is unusual when compared to identified trends and/or patterns in historical data for the particular element 115. Similarly, a high transaction count of a first element 115 and a low response time of a second element 115 may not be unusual when viewed in isolation. When the data related to these elements 115 is analyzed together, however, it may be revealed that a high transaction count in combination with a low response time is unusual when compared to identified trends and/or patterns in historical data related to the first and second elements 115. Further, an unusual trend and/or pattern may include an unusual sequence of features (e.g., peaks, flat points, precipitous drops, rapid increases, intervals of high variation, etc.) across a group of monitored characteristics. For example, a first monitored characteristic may experience a peak, followed by a second monitored characteristic experiencing a precipitous drop, followed by the first monitored characteristic experiencing unusually high variation. The particular sequence of features across this group of monitored characteristics may collectively constitute an unusual trend and/or pattern.

When an unusual trend and/or pattern is detected, monitoring node 130 may generate an alert record including data related to the unusual trend and/or pattern. In some embodiments, alert records generated by monitoring node 130 may be stored in memory 134. In other embodiments, alert records generated by monitoring node 130 may be stored in storage 140. An alert record may include an indication of the monitored elements 115 included in the unusual trend and/or pattern associated with the alert record. In some embodiments, the elements 115 included in the unusual trend and/or pattern associated with the alert record may include elements 115 for which values related to a monitored characteristic have deviated from an identified trend and/or pattern during the same time period. In other embodiments, the elements 115 included in the unusual trend and/or pattern associated with the alert record may include element 115 for which values related to a monitored characteristic have deviated from an identified trend and/or pattern during overlapping time periods. In other embodiments, the elements 115 included in the unusual trend and/or pattern associated with the alert record may include element 115 for which values related to a monitored characteristic have deviated from an identified trend and/or pattern in sequence.

An alert record may also include, for each monitored element 115 included in the unusual trend and/or pattern, the monitored characteristics included in the unusual trend and/or pattern. In some embodiments, the monitored characteristics included in an unusual trend and/or pattern may include monitored characteristics that deviate from an identified trend and/or pattern in the historical data during the time period associated with the alert record. Additionally, an alert record may include information related to a time at which the unusual trend and/or pattern related to the particular alert record was detected and/or identified and a time at which the latest data related to the unusual trend and/or pattern was collected.

An alert record may further include a deviation score. The deviation score may be a measure of the amount that data related to the elements 115 included in the unusual trend and/or pattern has deviated from an identified trend and/or pattern. In some embodiments, the graphical user interface may be configured to display alerts related to alert records with a deviation score that exceeds a predetermined threshold. Such a predetermined threshold may be set by a system and/or network administrator. Thus, although an alert record is generated for each unusual trend and/or pattern detected by monitoring node 130, an alert corresponding to each alert record may not be displayed to the user unless the deviation score included in the alert record exceeds the predetermined threshold.

Figure 2:
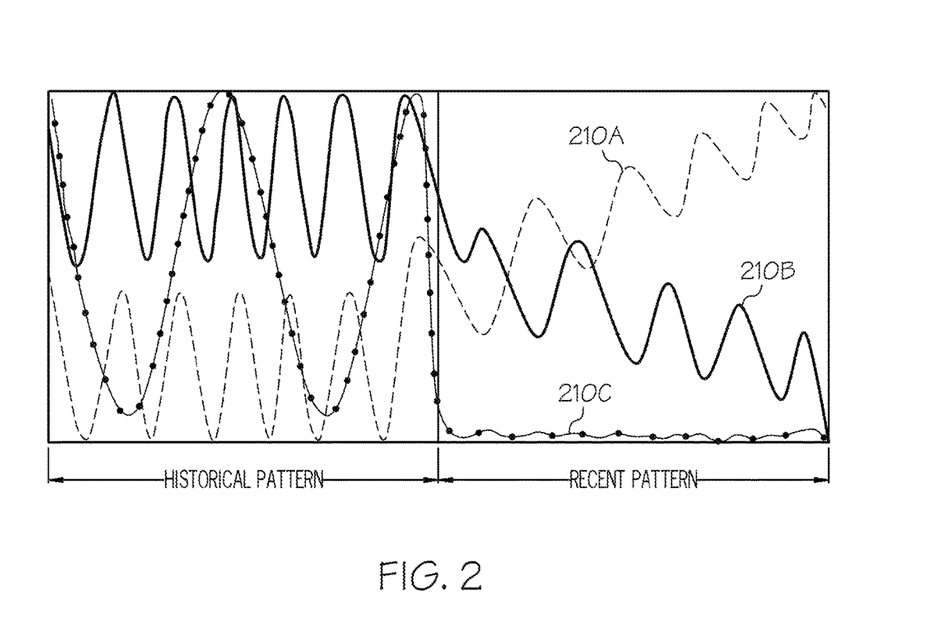
FIG. 2 is an example graph of data related to monitored characteristics of a particular element, in accordance with the teachings of the present disclosure.

FIG. 2 is an example graph of data related to monitored characteristics of a particular element 115. In the illustrated example, three characteristics of a particular element 115 may be monitored. Each of curves 210A, 210B, and 210C may graphically represent a measure of a monitored characteristic of the particular element 115 over a period of time. Monitoring module 136 may be configured to monitor and collect data related to the characteristics of element 115 that are graphically represented by curves 210A, 210B, and 210C. Monitoring node 130 may periodically analyze historical data stored in memory 134 and/or storage 140 to identify trends and/or patterns in the historical data related to the monitored characteristics represented by curves 201, 210B, and 210C. Historical data related to a particular monitored characteristic may be compared to data collected more recently to determine whether the more recently collected data exhibits an unusual trend and/or pattern. An unusual trend and/or pattern may include a trend and/or pattern that differs and/or deviates from an identified trend and/or pattern. An unusual trend and/or pattern may also include a sequence of unusual features, patterns, or trends across a group of monitored characteristics. If an unusual trend and/or pattern is detected in the data associated with a monitored characteristic of element 115, monitoring node 130 may generate an alert record related to the unusual trend and/or pattern. In some embodiments, data related to the alert record may be stored in memory 134. In other embodiments, data related to the alert record may be stored in storage 140.

Figure 3:
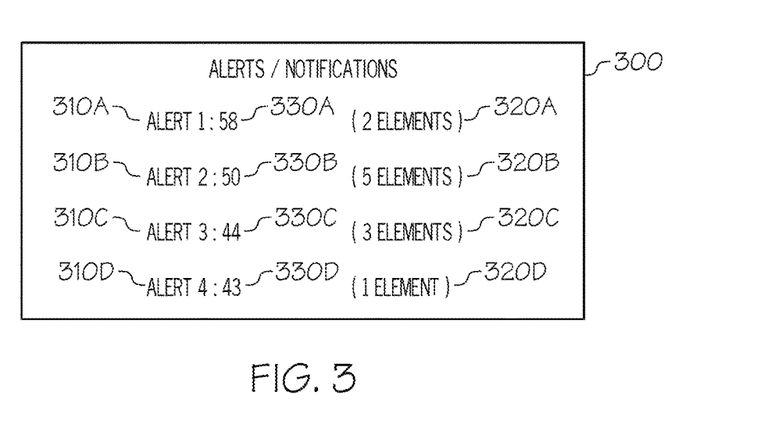
FIG. 3 illustrates an example graphical user interface including alerts identifying an alert record related to an unusual trend and/or pattern in values associated with one or more monitored characteristics of a particular element (or group of elements), in accordance with the teachings of the present disclosure.

FIG. 3 illustrates an example graphical user interface 300 including alerts 310 identifying an alert record related to an unusual trend and/or pattern in values associated with one or more monitored characteristics of a particular element (or group of elements). As discussed above with respect to FIG. 1, when an unusual trend and/or pattern is detected by monitoring node 130, an alert record including data related to the unusual trend and/or pattern may be stored in memory 134. Each alert 310 may be associated with an alert record stored in memory 134 and/or storage 100 (shown in FIG. 1). Each alert 310 may include an indication 320 regarding the number of elements 115 included in the unusual trend and/or pattern related to the alert 310. In some embodiments, the elements 115 included in the unusual trend and/or pattern may include elements 115 for which values related to a monitored characteristic have deviated from an identified trend and/or pattern during the same time period. For example, elements 115N and 1150 (shown in FIG. 1) may be included in alert 310A because data related to the response time of elements 115N and 1150 has deviated from an identified trend and/or pattern during a first time period, while elements 115C, 115F, and 115J (shown in FIG. 1) may be included in alert 310C because data related to the CPU utilization of elements 115C, 115F, and 115J has deviated from an indentified trend and/or pattern during a second time period. Similarly, elements 115AB, 115S, 115V, 115T, and 115P (shown in FIG. 1) may be included in alert 310B because data related to various monitored characteristics of elements 115AB, 115S, 115V, 115T, and 115P has deviated from an identified trend and/or pattern during a third time period.

Alerts 310 may also include an indication of a deviation score 330. The deviation score 330 may be a measure of the amount that data related to the elements 115 included in the alert 310 has deviated from an identified trend and/or pattern in historical data. In some embodiments, graphical user interface 300 may be configured to display only alerts 310 with a deviation score 330 that exceeds a predetermined threshold. Such a predetermined threshold may be set by a system and/or network administrator.

A user may access more detailed information regarding the alert record associated with a particular alert 310 by selecting (e.g., via keyboard, mouse, or other user input device) the particular alert 310. For example, monitoring node 130 (shown in FIG. 1) may be configured to receive a signal indicative of the user selecting a particular alert 310. In response, monitoring node 130 may graphically display information related to the alert record associated with the particular alert 310. Such a display of information related to the alert record associated with the particular alert 310 may be performed in accordance with graphical user interface 400 of FIG. 4, discussed below.

Figure 4:
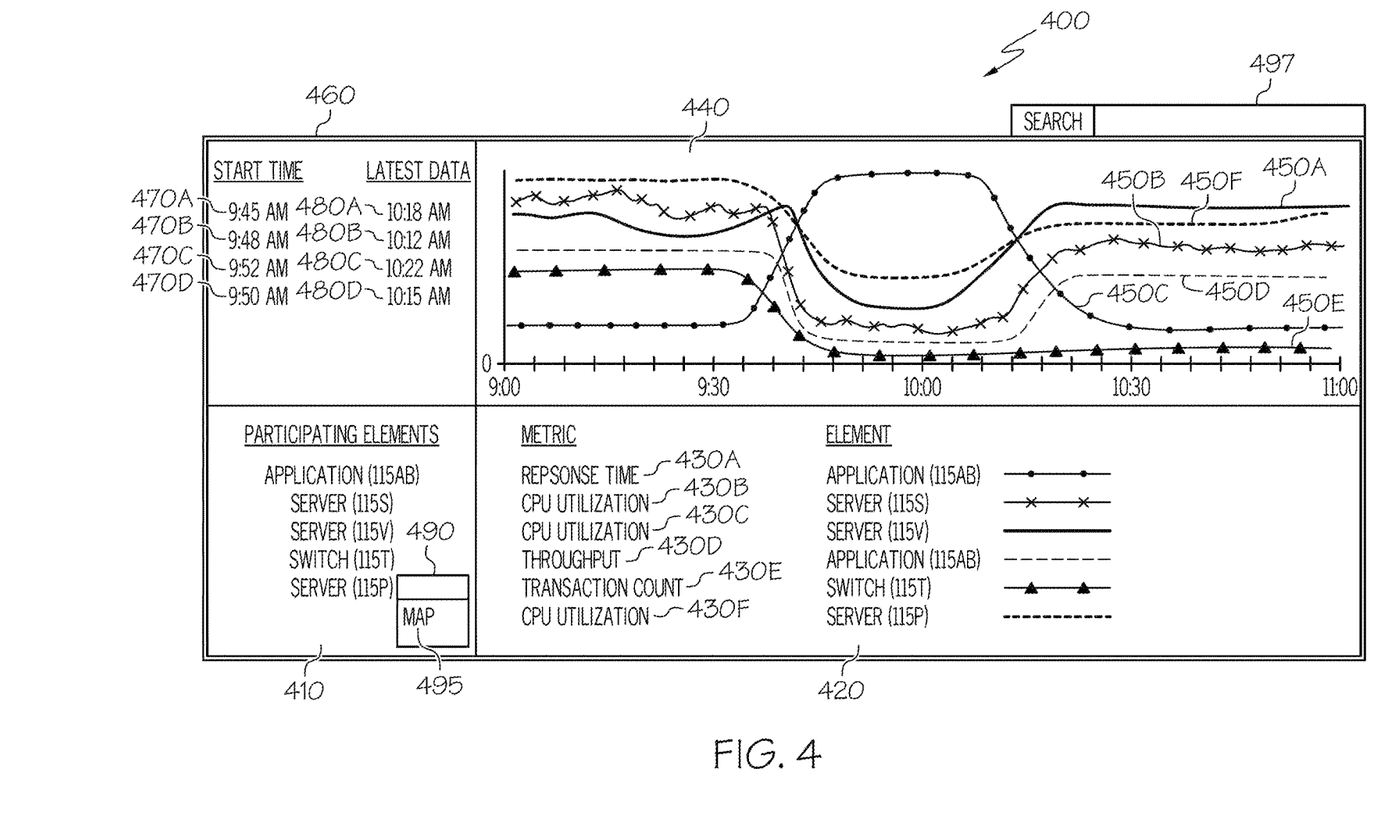
FIG. 4 illustrates an example graphical user interface including information related to an alert record related to an unusual trend and/or pattern in values associated with one or more monitored characteristics of a particular element (or group of elements), in accordance with the teachings of the present disclosure.

FIG. 4 illustrates an example graphical user interface 400 including information related to an alert record associated with an unusual trend and/or pattern in values associated with one or more monitored characteristics of a particular element (or group of elements). In the illustrated example, graphical user interface 400 may include information related to the alert record associated with alert 310B (shown in FIG. 3). Graphical user interface 400 may include a frame 410 configured to indicate which elements 115 are included in the unusual trend and/or pattern to which the particular alert 310 relates. For example, frame 410 includes a list of the elements 115AB, 115S, 115V, 115T, and 115P (shown in FIG. 1) that are included in the unusual trend and/or pattern related to alert 310B. Frame 410 may also include an indication of whether any of the elements 115 included in the particular alert 310 are related to one another. Elements 115 may be regarded as related and/or associated because they are included in the same logical or physical group. For example, elements 115AA, 115W, 115T, and 115P (shown in FIG. 1) may be regarded as related and/or associated because each of elements 115AA, 115W, and 115T is communicatively coupled to network 120 via element 115P. As another example, elements 115S and 115V (shown in FIG. 1) may be regarded as related and/or associated because of their relationship to element 115AB (shown in FIG. 1). In yet another example, elements 115S and 115V (shown in FIG. 1) may be regarded as related and/or associated because there is a mathematical relationship found in the data, even when there is no known physical or logical relationship among the elements. Mathematical relationships may include, without limitation, mathematical correlations in the data related to monitored characteristics of elements 115, common trends and/or patterns in the data related to monitored characteristics of elements 115, and/or an unusual sequence of features (e.g., peaks, flat points, precipitous drops, rapid increases, intervals of high variation, etc.) across a group of monitored characteristics. In some embodiments, elements 115 that are related and/or associated may be displayed in a particular color. In other embodiments, an asterisk or other symbol may be displayed adjacent to or near elements 115 that are related and/or associated.

A user may access information related to a particular element 115 included in the alert record corresponding to a particular alert 310 by selecting (e.g., via a keyboard, mouse, or other user input device) the particular element 115 from the list of included elements displayed in frame 410. For example, monitoring node 130 (shown in FIG. 1) may be configured to receive a signal indicative of the user selecting a particular included element 115. In response, monitoring node 130 may graphically display information related to the particular included element 115 selected by the user. Such a display of information related to the particular included element 115 may be performed in accordance with graphical user interface 500 of FIG. 5, discussed below.

Graphical user interface 400 may also include a frame 420 configured to indicate the monitored characteristics of the elements 115 that are included in the unusual trend and/or pattern related to the particular alert 310. For example, frame 420 includes a list of the monitored characteristics 430A-430F of elements 115AB, 115S, 115V, 115P, and 115T that exhibit the unusual trend and/or pattern related to alert 310B. As shown in frame 420, the monitored characteristics 430 that exhibit the unusual trend and/or pattern related to alert 310B are the response time 430A and throughput 430D of element 115AB, the CPU utilization 430B of element 115S, the CPU utilization 430C of element 115V, the transaction count 430E of element 115T, and the CPU utilization 430F of element 115P.

As illustrated by the example of FIG. 4, each element 115 included in a particular alert 310 may have one or more monitored characteristics 430 that exhibit the unusual trend and/or pattern related to the particular alert 310. For example, included element 115AB has two monitored characteristics 430A and 430D that exhibit the unusual trend and/or pattern related to alert 310B.

Graphical user interface 400 may further include a frame 440 configured to display a graph of data related to the monitored characteristics shown in frame 420. For example, frame 440 includes a graph of data related to monitored characteristics 430A-430F over a particular time period. In this example, curve 450A graphically represents the data related to monitored characteristic 430A, while curves 450B, 450C, 450D, 450E, and 450F graphically represent the data related to monitored characteristics 430B, 430C, 430D, 430E, and 430F, respectively. Unlike traditional graphical user interfaces, frame 440 may be configured to overlay the curves 450 representing the data related to monitored characteristics 430 on the same graph. For example, data related to a particular monitored characteristic 430 may be plotted as a percentage of the minimum and maximum values of the data related to the particular monitored characteristic during the particular time period. Displaying curves 450 in this manner may enable the user to compare trends and/or patterns among the various monitored characteristics 430 of included elements 115.

Graphical user interface 400 may also include a frame 460 configured to display, for each alert 310, the time 470 at which the unusual trend and/or pattern related to the particular alert 310 was detected and/or identified and the time 480 at which the latest data related to the unusual trend and/or pattern was collected. For example, start times 470A, 470B, 470C, and 470D may indicate the time at which the unusual trends and/or patterns related to alerts 310A, 310B, 310C, and 310D, respectively, were detected and/or identified. Similarly, latest data times 480A, 480B, 480C, and 480D may indicate the time at which the latest data related to the unusual trend and/or pattern related to alerts 310A, 310B, 310C, and 310D, respectively, was collected.

As illustrated in FIG. 4, graphical user interface 400 includes information related to the alert record associated with alert 310B. A user may access information related to an alert record associated with a different alert (e.g., a second alert) by selecting (e.g., via a keyboard, mouse, or other user input device) the start time 470 or latest data time 480 associated with the second alert 310 from frame 460. Monitoring node 130 (shown in FIG. 1) may be configured to receive a signal indicative of the user selecting a start time 470 or latest data time 480 associated with the second alert 310. In response, monitoring node 130 may graphically display information related to the second alert 310. Such a display of information related to the second alert may be performed in accordance with graphical user interface 400 of FIG. 4.

Graphical user interface 400 may also include a search bar 497. A user may access information related to various alert records by utilizing search bar 497. For example, the user may enter search criteria (e.g., via a keyboard, mouse, or other user input device) in search bar 497. Search criteria may include, without limitation, an element name or identifier, a time period of interest, and/or a deviation score threshold. Monitoring node 130 (shown in FIG. 1) may be configured to receive a signal indicative of the user entering search criteria in search bar 497. In response, monitoring node 130 may conduct a search of alert records stored in memory 134 and/or storage 140. After conducting a search of alert records, monitoring node 130 may graphically display search results including a list of alert records that satisfy the search criteria. For example, when the user enters search criteria including an element name or identifier, monitoring node 130 may conduct a search of alert records stored in memory 134 and/or storage 140. After conducting a search of alert records, monitoring node 130 may graphically display search results including a list of alert records including an element name or identifier matching the element name or identifier included in the search criteria. As another example, when the user enters search criteria including a particular time period of interest, monitoring node 130 may conduct a search of alert records stored in memory 134 and/or storage 140. After conducting a search of alert records, monitoring node 130 may graphically display search results including a list of alert records including a start time 470 and/or latest data time 480 that falls within the time period of interest. As yet another example, when the user enters search criteria including a deviation score threshold, monitoring node 130 may conduct a search of alert records stored in memory 134 and/or storage 140. After conducting a search of alert records, monitoring node 130 may graphically display search results including a list of alert records with a deviation score exceeding the deviation score threshold. Such a display of search results may be performed in accordance with graphical user interface 300 of FIG. 3, discussed above.

A user may access information related to the relationship of a particular included element 115 to other elements 115 of system 100 (shown in FIG. 1) by selecting (e.g., via a keyboard, mouse, or other user input device) a menu or option list associated with the particular included element 115. For example, monitoring node 130 (shown in FIG. 1) may be configured to receive a signal indicative of the user selecting (e.g., right-clicking with a mouse) the particular element 115 from the list of included elements 115 displayed in frame 410. In response, monitoring node 130 may graphically display a menu 490 associated with the particular included element 115. Menu 490 may include a list of various features and or options associated with the particular included element 115. In some embodiments, menu 490 may include an option 495 to display a map illustrating the relationship of the particular elements 115 to other elements 115 of system 100. The user may access the map by selecting (e.g., via a keyboard, mouse, or other user input device) map option 495 from menu 490. For example, the user may access a map illustrating the relationship of element 115P to other elements 115 of system 100 by selecting (e.g., via a keyboard, mouse, or other user input device) map option 495 from menu 490. Such a display of a map illustrating the relationship of a particular element 115 to other elements 115 of system 100 may be performed in accordance with graphical user interface 600 of FIG. 6, discussed below.

Figure 5:
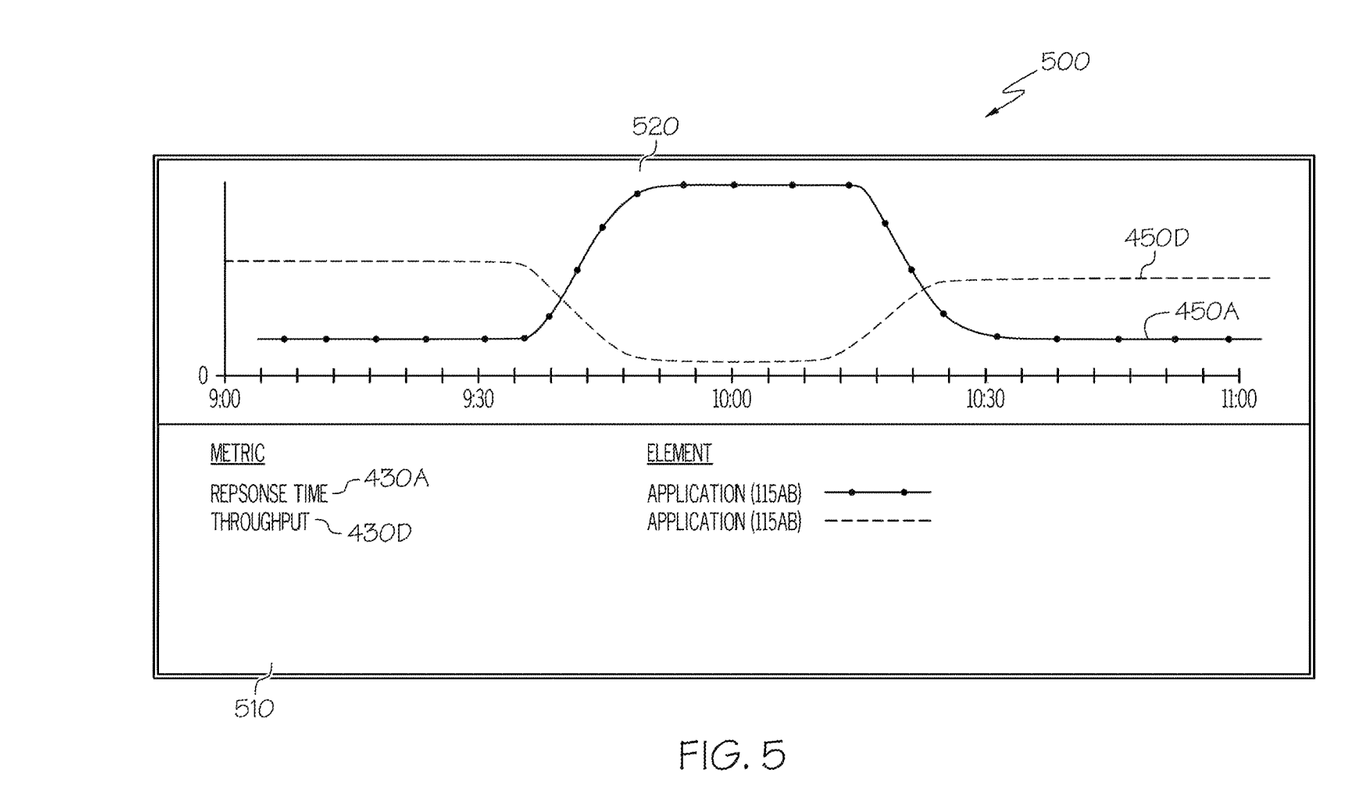
FIG. 5 illustrates an example graphical user interface including information related to a particular element included in an unusual trend and/or pattern related to a particular alert, in accordance with the teachings of the present disclosure.

FIG. 5 illustrates an example graphical user interface 500 including information related to a particular element 115 included in a particular alert 310. As discussed above with respect to FIG. 4, a user may access information related to a particular element 115 included in the alert record corresponding to a particular alert 310 by selecting the particular element 115 from the list of included elements displayed in frame 410. Such a display of information related to the particular included element 115 may be performed in accordance with graphical user interface 500. In the illustrated example, graphical user interface 500 includes information related to element 115AB included in alert 310B. In some embodiments, graphical user interface 500 may include a frame 510 configured to indicate the monitored characteristic(s) of the particular element 115 that exhibit(s) the unusual trend and/or pattern related to the particular alert 310. For example, frame 510 may include a list of the monitored characteristics 430A and 430D of included element 115AB that exhibit the unusual trend and/or pattern related to alert 310B. Graphical user interface 500 may also include a frame 520 configured to display a graph of data related to the monitored characteristics shown in frame 510. In the illustrated example, frame 520 includes a graph of data related to monitored characteristics 430A and 430D over a particular time period. In this example, curve 450A graphically represents the data related to monitored characteristic 430A and curve 450D graphically represents the data related to monitored characteristic 430D.

Figure 6:
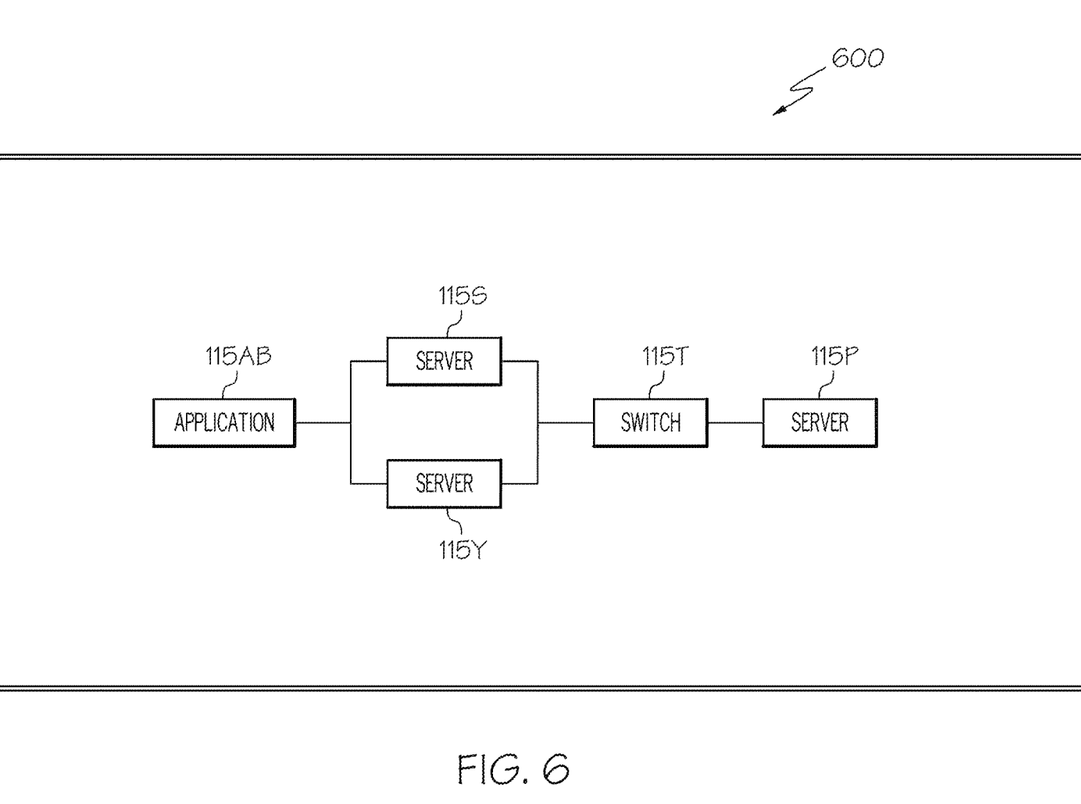
FIG. 6 illustrates an example graphical user interface including an illustration of the relationships among elements, in accordance with the teachings of the present disclosure.

In other embodiments, frame 510 may be configured to indicate all of the monitored characteristics of the particular included element 115, even if those monitored characteristics do not exhibit the unusual trend and/or pattern related to the particular alert 310. For example, frame 510 may be configured to include a list of all of the monitored characteristics of element 115AB, even if some of those monitored characteristics do not exhibit the unusual trend and/or pattern related to alert 310B. FIG. 6 illustrates an example graphical user interface 600 including an illustration of the relationships among elements 115 of system 100. For example, graphical user interface 600 includes a graphical representation of element 115P and the elements 115 of system 100 that are related to and/or associated with element 115P. In the illustrated example, graphical user interface includes a graphical representation of elements 115AB, 115S, 115V, and 115T, which are related and/or associated to element 115P because each of elements 115AB, 115S, 115V, and 115T is communicatively coupled to network 120 via element 115P. Graphical user interface 600 may also include a graphical representation of the manner in which elements 115AB, 115S, 115V, 115T, and 115P are communicatively coupled to one another.

Graphical user interface 600 may illustrate, among other things, the flow of data between and among the elements 115 that are graphically represented in graphical user interface 600. For example, FIG. 6 illustrates that data transferred to element 115AB from network 120 must first pass through elements 115P, 115T, and 115S or 115V. Similarly, FIG. 6 illustrates that data transferred from element 115AB to network 120 must first pass through elements 115S or 115V, 115P, and 115T.

A user may access information related to elements 115S, 115V, 115T, and 115P by selecting (e.g., via a keyboard, mouse, or other user input device) the graphical representation of a particular element 115 displayed in frame graphical user interface 600. Monitoring node 130 (shown in FIG. 1) may be configured to receive a signal indicative of the user selecting a particular element 115. In response, monitoring node 130 may graphically display a graphical user interface (similar to the graphical user interface illustrated in FIG. 5) including information related to the particular element 115 selected by the user.

Figure 7:
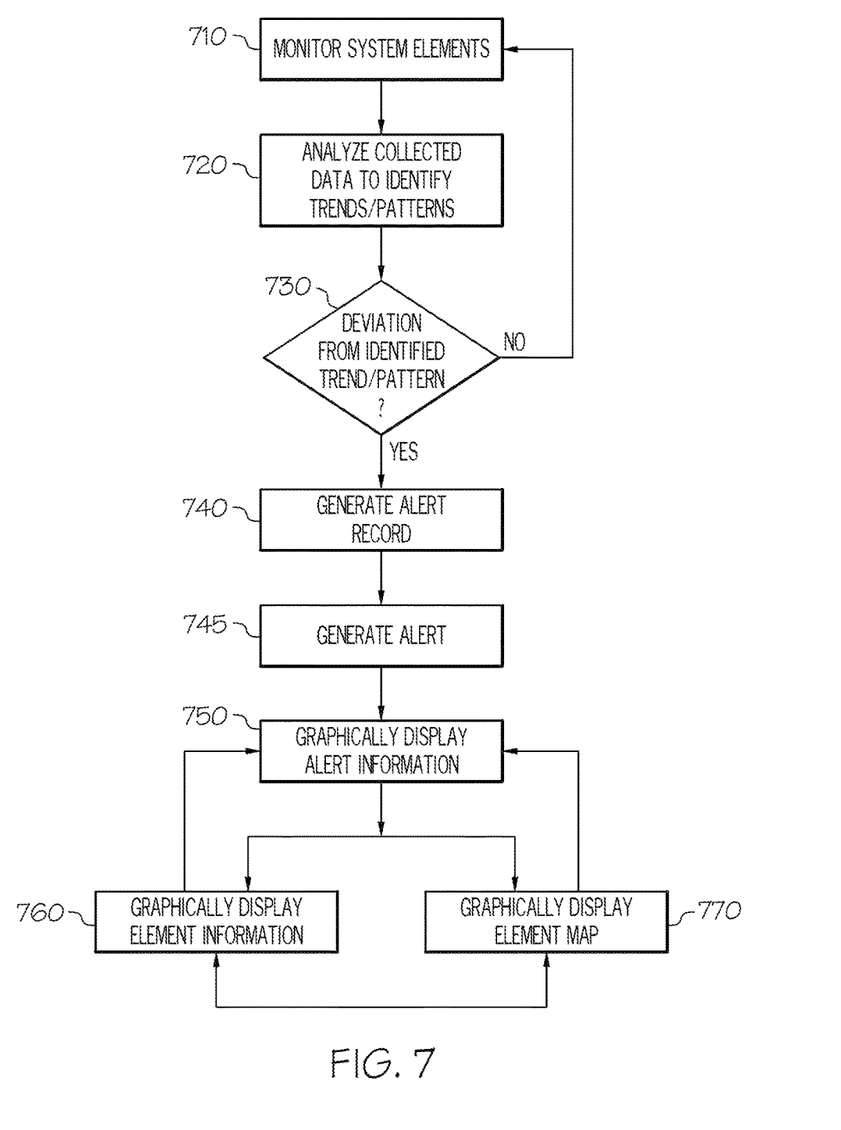
FIG. 7 is a flowchart of an example method of generating a graphical user interface, in accordance with the teachings of the present disclosure.

FIG. 7 is a flowchart of an example method 700 of generating a graphical user interface in accordance with the teachings of the present disclosure. Although FIG. 7 discloses a particular number of steps to be taken with respect to example method 700, method 700 may be executed with more or fewer steps than those depicted in FIG. 7. In addition, although FIG. 7 discloses a certain order of steps to be taken with respect to method 700, the steps of these methods may be completed in any suitable order. Method 700 may be implemented using the system of FIG. 1 or any other suitable mechanism. In certain embodiments, method 700 may be implemented partially or fully in software embodied in computer-readable storage media.

Program instructions may be used to cause a general-purpose or special-purpose processing system that is programmed with the instructions to perform the operations described below. The operations may be performed by specific hardware components that contain hardwired logic for performing the operations, or by any combination of programmed computer components and custom hardware components. Method 700 may be provided as a computer program product that may include one or more machine readable media having stored thereon instructions that may be used to program a processing system or other electronic device to perform the methods.

In some embodiments, method 700 may begin at step 710. At step 710, the monitoring module of the monitoring node (shown in FIG. 1) may collect data related to monitored characteristics of each element of a computer system. As discussed above with respect to FIG. 1, each element may include a server (e.g., blade server or rack server), personal computer (e.g., desktop or laptop), tablet computer, mobile device (e.g., personal digital assistant (PDA) or smart phone), network storage device, printer, switch, router, data collection device, virtual machine, script, executable, firmware, library, shared library, function, module, software application, or any other suitable device or application. The particular characteristics of each element that will be monitored may, for example, be determined and set by a system administrator. The monitoring module may be configured to actively and/or passively monitor various characteristics of each element and collect data related to various metrics, each of which may represent a measure of a particular monitored characteristic. In some embodiments, the monitoring module may be configured to collect data related to the monitored characteristics of each element at particular time intervals and the data collected by the monitoring module may be stored in the memory of the monitoring node.

At step 720, the monitoring node may analyze historical data collected by the monitoring module to identify trends and/or patterns in the historical data related to monitored characteristics of the elements. Identified trends and/or patterns in the historical data may be used to define typical and/or normal behavior of the elements. In some embodiments, the monitoring node may use multivariate statistical analysis to identify trends and/or patterns in the data related to the various monitored characteristics of the elements.

At step 730, the monitoring node may, as additional data is collected by the monitoring module, analyze more recently collected data to identify deviations from the trends and/or patterns identified in historical data. The data related to a particular monitored characteristic may deviate from an identified trend and/or pattern in the historical data when the values representing a measure of the monitored characteristic are inconsistent with and/or unusual when compared to an identified trend and/or pattern in the historical data. Such deviations may be referred to as unusual trends and/or patterns.

An unusual trend and/or pattern may include a trend and/or pattern in data related to a monitored characteristic that differs or deviates from an identified trend and/or pattern. For example, an unusual trend and/or pattern may include peaks or flat points in the data related to a particular monitored characteristic that differ or deviate from an identified trend and/or pattern. Additionally, an unusual trend and/or pattern may include a trend and/or pattern in the data related to a group of monitored characteristics that is unusual only when analyzed in combination. For example, a high transaction count and low response time for a particular element may not be unusual when viewed in isolation. When the data related to these metrics is analyzed together, however, it may be revealed that a high transaction count in combination with a low response time is unusual when compared to identified trends and/or patterns in historical data for the particular element. Similarly, a high transaction count of a first element and a low response time of a second element may not be unusual when viewed in isolation. When the data related to these elements is analyzed together, however, it may be revealed that a high transaction count in combination with a low response time is unusual when compared to identified trends and/or patterns in historical data related to the first and second elements. Further, an unusual trend and/or pattern may include an unusual sequence of features (peaks, flat points, precipitous drops, rapid increases, intervals of high variation, etc.) across a group of monitored characteristics. For example, a first monitored characteristic may experience a peak, followed by a second monitored characteristic experiencing a precipitous drop, followed by the first monitored characteristic experiencing unusually high variation. The particular sequence of features across this group of monitored characteristics may collectively constitute an unusual trend and/or pattern.

At step 740, if the monitoring node determines that data related to a monitored characteristic (or a group of monitored characteristics) has deviated from an identified trend or pattern in historical data, the monitoring node may generate an alert record including data related to the unusual trend and or pattern. Alert records generated by the monitoring node may be stored in memory. An alert record may include an indication of the monitored elements included in the unusual trend and/or pattern associated with the alert record. In some embodiments, the elements included in the unusual trend and/or pattern associated with the alert record may include elements for which values related to a monitored characteristic have deviated from an identified trend and/or pattern during the same time period. In other embodiments, the elements included in the unusual trend and/or pattern associated with the alert record may include element for which values related to a monitored characteristic have deviated from an identified trend and/or pattern during overlapping time periods. In other embodiments, the elements included in the unusual trend and/or pattern associated with the alert record may include element for which values related to a monitored characteristic have deviated from an identified trend and/or pattern in sequence.

An alert record may also include, for each monitored element included in the unusual trend and/or pattern, the monitored characteristics included in the unusual trend and/or pattern. In some embodiments, the monitored characteristics included in an unusual trend and/or pattern may include monitored characteristics that deviate from an identified trend and/or pattern in the historical data during the time period associated with the alert record. Additionally, an alert record may include information related to a time at which the unusual trend and/or pattern related to the particular alert record was detected and/or identified and a time at which the latest data related to the unusual trend and/or pattern was collected.

An alert record may further include a deviation score. The deviation score may be a measure of the amount that data related to the elements included in the unusual trend and/or pattern has deviated from an identified trend and/or pattern.

At step 745, monitoring node may generate an alert associated with an alert record. The monitoring node may be configured to generate an alert for alert records that meet certain criteria. For example, the monitoring node may generate an alert related to alert records with a deviation score that exceeds a predetermined threshold. Such a predetermined threshold may be set by a system and/or network administrator. Thus, although an alert record is generated for each unusual trend and/or pattern detected by the monitoring node, an alert corresponding to each alert record may not be generated and/or displayed to the user.

At step 750, in response to a user selecting a particular alert (e.g., via keyboard, mouse, or other user input device), the monitoring node may display a graphical user interface including information related to the alert record associated with the particular alert. As discussed above with respect to FIG. 4, the graphical user interface may include, without limitation, frames configured to indicate (1) which elements are included in the unusual trend and/or pattern to which the particular alert relates, and (2) the monitored characteristics of the included elements that exhibit the unusual trend and/or pattern. The graphical user interface may also include a frame configured to display a graph of data related to the monitored characteristics that exhibit the unusual trend and/or pattern. Each curve displayed on the graph may graphically represent the data related to a particular monitored characteristic that exhibits the unusual trend and/or pattern. The curves representing the data related to the monitored characteristics that exhibit the unusual trend and/or pattern may be overlayed on the same graph. For example, in some embodiments, data related to a particular monitored characteristic may be plotted as a percentage of the minimum and maximum values of the data related to the particular monitored characteristic during the particular time period. Displaying each curve in this manner may enable the user to compare trends and/or patterns among the various monitored characteristics of the elements included in the particular alert. The graphical user interface may further include a frame configured to display, for each alert, a time at which the unusual trend and/or pattern related to the particular alert was detected and/or identified, which may be referred to as the start time, and a time at which the latest data related to the unusual trend and/or pattern was collected, which may be referred to as the latest data time.

As discussed above with respect to FIG. 4, a user may access information related to an alert record associated with a different alert (e.g., a second alert) by selecting (e.g., via a keyboard, mouse, or other user input device) the start time or latest data time associated with the alert. In response, the monitoring node may graphically display information related to the alert.

At step 760, in response to a user selecting a particular included element (e.g., via keyboard, mouse, or other user input device), the monitoring node may display a graphical user interface including information related to the particular included element. As discussed above with respect to FIG. 5, in some embodiments the graphical user interface may include a frame configured to indicate all monitored characteristic of the particular included element that exhibit the unusual trend and/or pattern related to the particular alert. In other embodiments, the graphical user interface may include a frame configured to indicate all of the monitored characteristics of the particular included element, even if not all of the monitored characteristics exhibit the unusual trend and/or pattern related to the particular alert. The graphical user interface may also include a frame configured to display a graph of data related to the monitored characteristic(s) of the particular included element. In some embodiments, the frame may include a graph of data related to a monitored characteristic of the particular element that exhibits the unusual trend and/or pattern related to the particular alert. In other embodiments, the frame may include a graph of data related to all the monitored characteristics of the particular element, even those that do not exhibit the unusual trend and/or pattern related to the particular alert.

At step 770, in response to a user selection (e.g., via keyboard, mouse, or other user input device), the monitoring node may display a graphical user interface including information related to the relationships among a particular element and included in the unusual trend and/or pattern related to the particular alert and other elements of the system. As discussed above with respect to FIG. 6, the graphical user interface may include a graphical representation of the manner in which the particular included element is communicatively coupled to other elements of the system.

As illustrated in FIG. 7, the method may proceed from step 750 to step 760 or step 770. Additionally, the method may proceed from any of step 760 to step 770 or may return to step 750. Similarly, the method may proceed from step 770 to step 760 or may return to step 750.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of generating a graphical user interface, the method comprising:
   monitoring a plurality of elements of a computer system;
   collecting data related to a monitored characteristic of each element of the plurality of elements;
   analyzing, using multivariate statistical analysis, the collected data at a first time to identify a pattern, wherein the collected data at the first time comprises historical data;
   analyzing the collected data at a second time to determine whether the collected data has deviated from the identified pattern;
   generating an alert record in response to a determination that the collected data has deviated from the identified pattern, wherein generating the alert record comprises:
      identifying a collective sequence of features across a first monitored characteristic and a second monitored characteristic of a particular element of the plurality of elements for which the collected data has deviated from the identified pattern, such that the features in sequence collectively constitute the deviation;
      identifying a time period during which the collected data related to the monitored characteristic of the particular element deviated from the identified pattern, wherein the time period comprises a start time indicating when the deviation from the identified pattern was detected; and
      generating the alert record including an identification of the particular element;
   storing the alert record;
   generating for display a graph of information for a particular time period related to the monitored characteristics of the subset of the plurality of monitored elements for which the collected data has deviated from the identified pattern;
   generating graphical display information related to the first monitored characteristic of a first element of the plurality of elements for which the collected data has deviated from the identified pattern; and
   generating graphical display information related to the second monitored characteristic of the first element of the plurality of elements for which the collected data has deviated from the identified pattern,
   wherein the information related to the first monitored characteristic and the information related to the second monitored characteristic are displayed together on a graph while excluding information related to monitored characteristics for which the collected data has not deviated from the identified pattern.

2. The method of claim 1, wherein analyzing the collected data at the first time to identify a pattern comprises:
   analyzing historical data related to the monitored characteristics at the first time, the historical data including data collected before the first time; and
   identifying the pattern in the historical data.

3. The method of claim 1, wherein analyzing the collected data at the second time to determine whether the collected data has deviated from the identified pattern comprises:
   analyzing recent data related to the monitored characteristics at the second time, wherein the recent data is data collected before the second time and after the first time; and
   determining whether the recent data has deviated from the identified pattern.

4. The method of claim 1, wherein identifying the monitored characteristic of the particular element for which the collected data has deviated from the identified pattern comprises:
   identifying the first monitored characteristic of the particular element for which the collected data has deviated from the identified pattern;
   identifying the second monitored characteristic of the particular element for which the collected data has deviated from the identified pattern;
   identifying the time period during which the collected data related to the first monitored characteristic and the second monitored characteristic deviated from the identified pattern, wherein the collected data related to the first monitored characteristic deviated from the identified pattern during a first time period and the collected data related to the second monitored characteristic deviated from the identified pattern during a second time period; and
   generating the alert record including an identification of the particular element.

5. The method of claim 1, wherein generating the alert record in response to a determination that the collected data has deviated from the identified pattern comprises:
   identifying the first monitored characteristic of a second element of the plurality of elements for which the collected data has deviated from the identified pattern;
   identifying the second monitored characteristic of the second element of the plurality of elements for which the collected data has deviated from the identified pattern; and
   generating the alert record including an identification of the first element and the second element.

6. A non-transitory computer-readable storage medium, comprising computer-executable instructions carried on the computer readable medium, the instructions readable by a processor and, when read and executed, configured to cause the processor to:
   monitor a plurality of elements of a computer system;
   continuously collect data related to a monitored characteristic of each element of the plurality of elements;
   analyze, using multivariate statistical analysis, a first subset of the collected data at a first time to identify a pattern;
   analyze a second subset of the collected data at a second time to determine whether the collected data has deviated from the identified pattern;
   generate an alert record in response to a determination that the second subset of the collected data has deviated from the identified pattern, wherein generating the alert record comprises:

identifying a collective sequence of features across a first monitored characteristic and a second monitored characteristic of a particular element of the plurality of elements for which the second subset of the collected data has deviated from the identified pattern such that the features in sequence collectively constitute the deviation;

identifying a time period during which the second subset of the collected data related to the monitored characteristic of the particular element deviated from the identified pattern; and generating the alert record including an identification of the particular element;

store the alert record;

generate for display a graph of information related to the monitored characteristics of the subset of the plurality of monitored elements for which the collected data has deviated from the identified pattern;

generate graphical display information related to the first monitored characteristic of a first element of the plurality of elements for which the collected data has deviated from the identified pattern; and generate graphical display information related to the second monitored characteristic of the first element of the plurality of elements for which the collected data has deviated from the identified pattern, wherein the information related to the first monitored characteristic and the information related to the second monitored characteristic are displayed together on a graph while excluding information related to monitored characteristics for which the collected data has not deviated from the identified pattern.

7. The non-transitory computer-readable storage medium of claim 6, wherein analyzing the first subset of the collected data at the first time to identify the pattern comprises:

analyzing historical data related to the monitored characteristics at the first time, the historical data including data collected before the first time; and identifying a pattern in the historical data.

8. The non-transitory computer-readable storage medium of claim 6, wherein analyzing the second subset of the collected data at the second time to determine whether the second subset of the collected data has deviated from the identified pattern comprises:

analyzing recent data related to the monitored characteristics at the second time, wherein the recent data is data collected before the second time and after the first time; and determining whether the recent data has deviated from the identified pattern.

9. The non-transitory computer-readable storage medium of claim 6, wherein identifying the monitored characteristic of the particular element for which the second subset of the collected data has deviated from the identified pattern comprises:

identifying the first monitored characteristic of the particular element for which the second subset of the collected data has deviated from a first identified pattern;

identifying the second monitored characteristic of the particular element for which the second subset of the collected data has deviated from a second identified pattern; and generating the alert record including an identification of the particular element.

10. The non-transitory computer-readable storage medium of claim 6, wherein generating the alert record in response to a determination that the second subset of the collected data has deviated from the identified pattern comprises:

identifying the first monitored characteristic of a second element of the plurality of elements for which the second subset of the collected data has deviated from the identified pattern;

identifying the second monitored characteristic of the second element of the plurality of elements for which the second subset of the collected data has deviated from the identified pattern; and generating the alert record including an identification of the first element and the second element.

11. The non-transitory computer-readable storage medium of claim 6, wherein the second subset of the collected data comprises the first subset of the collected data.

12. An apparatus for monitoring a plurality of elements of a computer system, the apparatus comprising:

a processor; and a memory communicatively coupled to the processor, the memory comprising instructions operable, when executed by the processor, to cause the processor to:

monitor a plurality of elements of a computer system;

collect data related to a monitored characteristic of each element of the plurality of elements;

analyze, using multivariate statistical analysis, the collected data at a first time to identify a pattern;

analyze the collected data at a second time to determine whether the collected data has deviated from the identified pattern;

generate an alert record in response to a determination that the collected data has deviated from the identified pattern, wherein generating the alert record comprises:

identifying a collective sequence of features across a first monitored characteristic and a second monitored characteristic of the particular element of the plurality of elements for which the collected data has deviated from the identified pattern such that the features in sequence collectively constitute the deviation; and identifying a time period during which the collected data related to the monitored characteristic of the particular element deviated from the identified pattern;

store the alert record;

generate for display a graph of information related to the monitored characteristic of the subset of the plurality of monitored elements for which the collected data has deviated from the identified pattern;

select a particular element from the subset of the plurality of monitored elements identified in the alert record;

generate for display a graph of information related to the monitored characteristics of the particular element;

generate graphical display information related to the first monitored characteristic of a first element of the plurality of elements for which the collected data has deviated from the identified pattern; and generate graphical display information related to the second monitored characteristic of the first element of the plurality of elements for which the collected data has deviated from the identified pattern, wherein the information related to the first monitored characteristic and the information related to the second monitored characteristic are displayed together on a graph while excluding information related to monitored characteristics for which the collected data has not deviated from the identified pattern.

13. The apparatus of claim 12, wherein analyzing the collected data at the first time to identify the pattern comprises:
   analyzing historical data related to the monitored characteristics at the first time, the historical data including data collected before the first time; and
   identifying a pattern in the historical data.

14. The apparatus of claim 12, wherein analyzing the collected data at the second time to determine whether the collected data has deviated from the identified pattern comprises:
   analyzing recent data related to the monitored characteristics at the second time, wherein the recent data is data collected before the second time and after the first time; and
   determining whether the recent data has deviated from the identified pattern.

15. The apparatus of claim 12, wherein identifying the monitored characteristic of the particular element for which the collected data has deviated from the identified pattern comprises:
   identifying the first monitored characteristic of the particular element for which the collected data has deviated from a first identified pattern;
   identifying the second monitored characteristic of the particular element for which the collected data has deviated from a second identified pattern;
   identifying the time period during which the collected data related to the first monitored characteristic and the second monitored characteristic deviated from the identified pattern; and
   generating the alert record including an identification of the particular element.

16. The apparatus of claim 12, wherein generating the alert record in response to a determination that the collected data has deviated from the identified pattern comprises:
   identifying the first monitored characteristic of a second element of the plurality of elements for which the collected data has deviated from a first identified pattern;
   identifying the second monitored characteristic of the second element of the plurality of elements for which the collected data has deviated from a second identified pattern; and
   generating the alert record including an identification of the first element and the second element.

* * * * *